(12) United States Patent
Kornbluth et al.

(10) Patent No.: US 11,575,141 B2
(45) Date of Patent: Feb. 7, 2023

(54) NITROGEN-DOPED PHOSPHORIC ACID FUEL CELL ELECTROLYTE

(71) Applicant: Robert Bosch GmbH, Stuttgart (DE)

(72) Inventors: Mordechai Kornbluth, Brighton, MA (US); Soo Kim, Cambridge, MA (US); Jonathan Mailoa, Cambridge, MA (US)

(73) Assignee: ROBERT BOSCH GMBH, Stuttgart (DE)

( * ) Notice: Subject to any disclaimer, the term of this patent is extended or adjusted under 35 U.S.C. 154(b) by 142 days.

(21) Appl. No.: 16/886,087

(22) Filed: May 28, 2020

(65) Prior Publication Data
US 2021/0376366 A1 Dec. 2, 2021

(51) Int. Cl.
*H01M 8/1034* (2016.01)

(52) U.S. Cl.
CPC .. *H01M 8/1034* (2013.01); *H01M 2300/0068* (2013.01)

(58) Field of Classification Search
CPC ............ H01M 8/1034; H01M 2300/0068
See application file for complete search history.

(56) References Cited

U.S. PATENT DOCUMENTS

| | | | | |
|---|---|---|---|---|
| 2002/0160271 A1* | 10/2002 | Freeh | ............ | H01B 1/122 429/314 |
| 2006/0199063 A1* | 9/2006 | Miura | ............ | H01M 4/9016 429/483 |
| 2012/0270122 A1* | 10/2012 | Jensen | ............ | H01M 8/1009 429/415 |
| 2013/0316250 A1* | 11/2013 | Khalifah | ............ | H01M 10/054 429/318 |
| 2013/0323492 A1* | 12/2013 | Finch | ............ | C08L 3/02 428/221 |
| 2018/0237461 A1* | 8/2018 | Sakaguchi | ............ | H01M 10/0567 |

FOREIGN PATENT DOCUMENTS

| | | |
|---|---|---|
| KR | 20150051482 A | 5/2015 |
| XN | 02056406 A1 | 7/2002 |

OTHER PUBLICATIONS

Euclidating the diffusion pathway of protons in ammonium polyphosphate: a potential electrolyte for intermediate temperature fuel cells; Chunwen Sun, Carlos Alberto Lopez, Jose Antonio Alonso; Journal of Materials Chemistry A, 2017, 5, 7839; May 28, 2017 (Year: 2017).*

* cited by examiner

*Primary Examiner* — Sarah A. Slifka
*Assistant Examiner* — Rachel L Zhang
(74) *Attorney, Agent, or Firm* — Brooks Kushman P.C.

(57) ABSTRACT

A fuel cell electrolyte includes a nitrogen-doped phosphate tetrahedral network having a plurality of linked tetrahedra, each of the plurality of the linked tetrahedra having a phosphorus cation center and four anions including oxygen or nitrogen, the network having at least one compound of formula (I):

$$H_{3+x}PO_{4-x}N_x$$

where x is any number between 0.001 and 3.

13 Claims, 5 Drawing Sheets

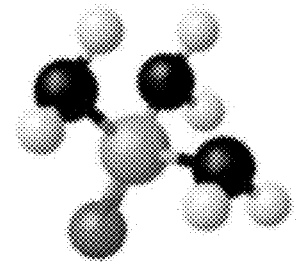
FIG. 2D
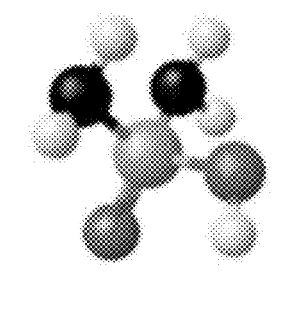
FIG. 2C
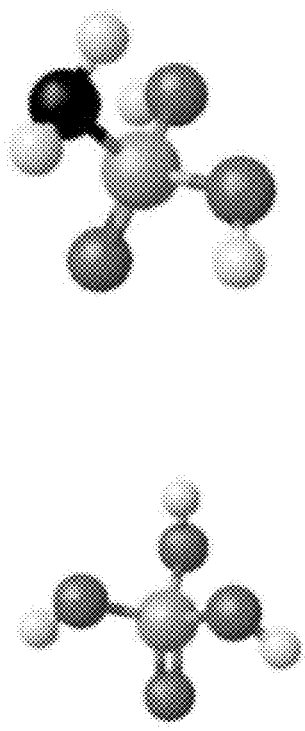
FIG. 2B
FIG. 2A
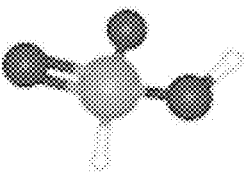
FIG. 2H
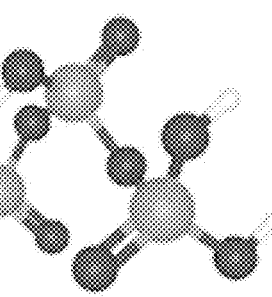
FIG. 2G
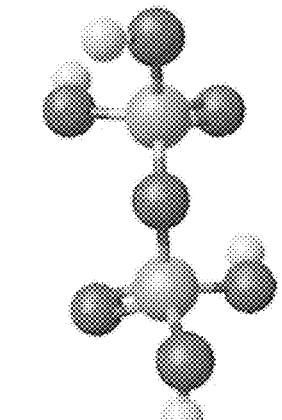
FIG. 2F
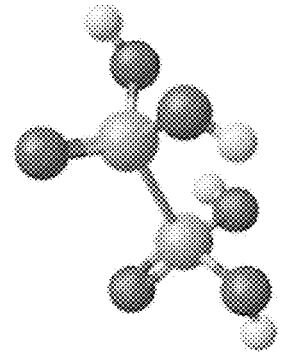
FIG. 2E
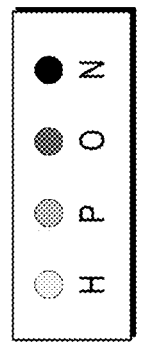

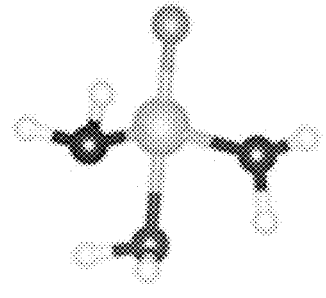
FIG. 3A  FIG. 3B  FIG. 3C  FIG. 3D
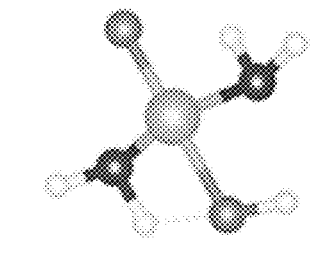
FIG. 4A  FIG. 4B
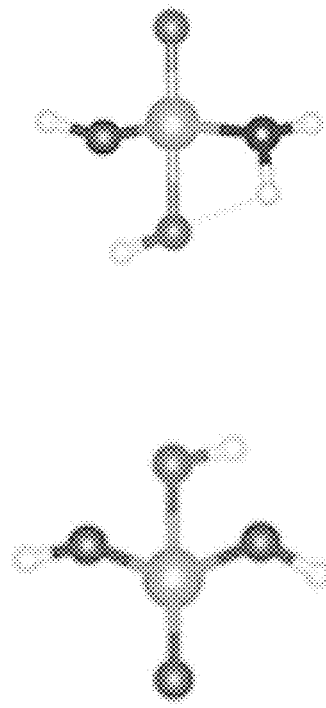
FIG. 4C
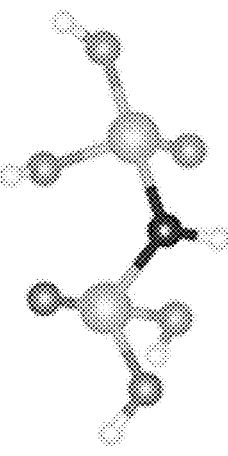
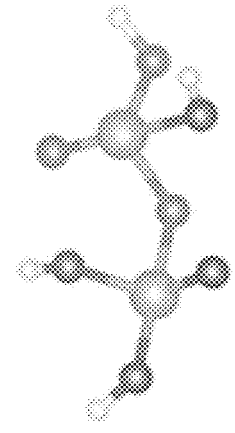
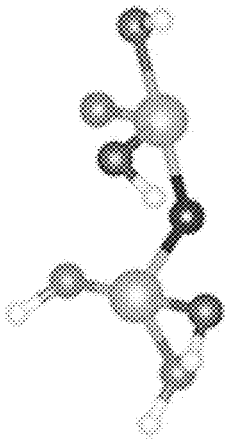
FIG. 4E
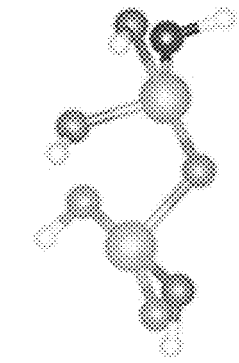
FIG. 4D
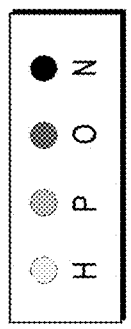

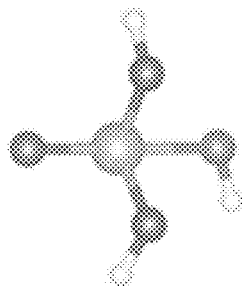
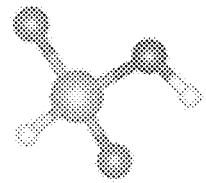
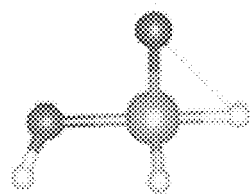
FIG. 5A  FIG. 5B  FIG. 5C
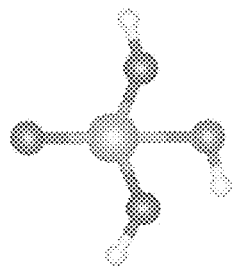
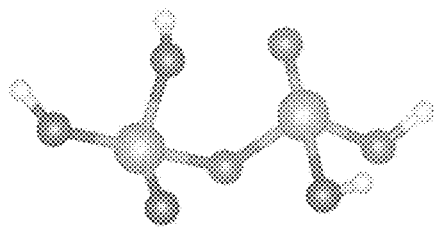
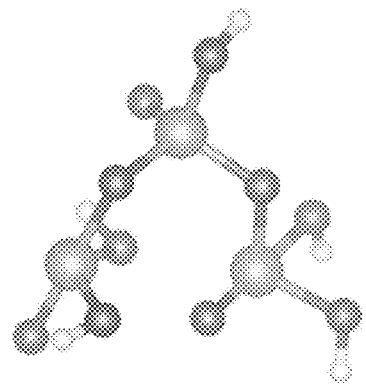
FIG. 6A  FIG. 6B  FIG. 6C
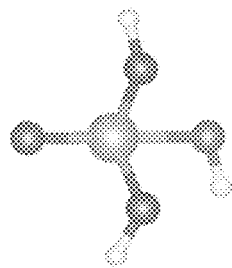
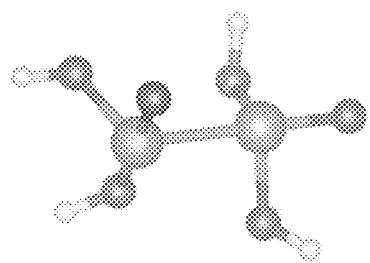
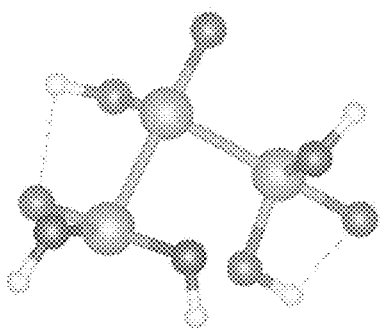
FIG. 7A  FIG. 7B  FIG. 7C
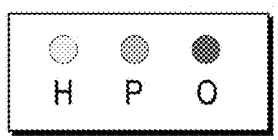

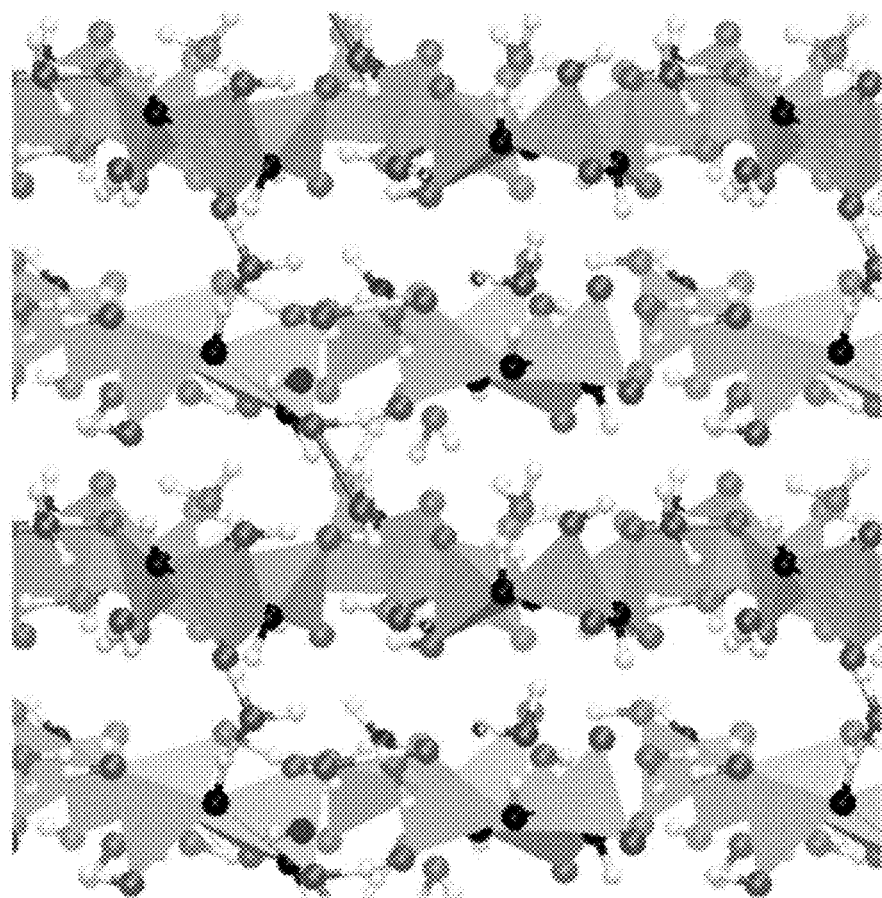
FIG. 8
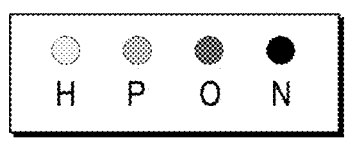

NITROGEN-DOPED PHOSPHORIC ACID FUEL CELL ELECTROLYTE

TECHNICAL FIELD

The present disclosure relates to a nitrogen-doped phosphoric acid fuel cell electrolyte and a method of producing the same.

BACKGROUND

Fuel cells have become an attractive source of alternative energy for stationary and mobile applications. Many different types of fuel cells have been developed, featuring different structures, chemistry, tolerance to fuel chemistry, operating temperatures, etc. A typical fuel cell includes an anode, a cathode, and an electrolyte enabling transport of ions between the two sides of the fuel cell. The type of electrolyte influences many properties of the fuel cell. Thus, since the conception of the fuel cells, efforts to develop a well-suited electrolyte have been made.

SUMMARY

According to one embodiment, a fuel cell electrolyte is disclosed. The fuel cell electrolyte may include a nitrogen-doped phosphate tetrahedral network having a plurality of linked tetrahedra, each of the plurality of the linked tetrahedra having a phosphorus cation center and four anions including oxygen or nitrogen, the network having at least one compound of formula (I):

$$H_{3+x}PO_{4-x}N_x \qquad (I),$$

where x is any number between 0.001 and 3.

The at least one compound of formula (I) may include phosphoramidate ($H_4PO_3N$), diamidophosphate ($H_5PO_2N_2$), phosphoramide ($H_6PON_3$), or a combination thereof. The at least one compound of formula (I) may have a pKa value of 0.5 to 7. The at least one compound of formula (I) may include monoammonium phosphate ($NH_4$)($H_2PO_4$), diammonium phosphate ($NH_4$)$_2HPO_4$, or ammonium polyphosphate $[NH_4PO_3]_n(OH)_2$, where n is the chain length and is 0 to 1000 or more. About 30 to 70% atomic P in the at least one compound of formula (I) may be substituted with Si, B, and/or Al. The network may also include a plurality of nitrogen bridges. The network may also include at least one of phosphoric acid ($H_3PO_4$), nitrogen-doping hypophosphoric acid ($H_4P_2O_6$), pyrophosphoric acid ($H_4P_2O_7$), triphosphoric acid ($H_5P_3O_{10}$), metaphosphoric acid ($HPO_3$), and polyphosphoric acid ($HO[PO_2OH]_nH$).

In an alternative embodiment, a nitrogen-doped phosphoric acid fuel cell electrolyte is disclosed. The electrolyte may include a plurality of interlinked tetrahedra forming a network, each of the plurality of the linked tetrahedra having a phosphorus cation center and four anions including oxygen or nitrogen, the network having at least one compound of formula (II):

$$H_{3+x-2y}PO_{4-x-y}N_x \qquad (II),$$

where
x is any number between 0 and 3; and
y is any number between 0 and 1.5.

The at least one compound of formula (II) may include hypoamidphosphate, polyamidphosphate, or a combination thereof. The network may be amorphous. The at least one compound of formula (II) may include monoammonium phosphate ($NH_4$)($H_2PO_4$), diammonium phosphate ($NH_4$)$_2HPO_4$, or ammonium polyphosphate $[NH_4PO_3]_n(OH)_2$, where n is the chain length and is 0 to 1000 or more. About 30 to 70% atomic P in the at least one compound of formula (II) may be substituted with Si, B, and/or Al. The at least one compound of formula (II) may have pKa of 0.5 to 7. The network may also include at least one of phosphoric acid ($H_3PO_4$), nitrogen-doping hypophosphoric acid ($H_4P_2O_6$), pyrophosphoric acid ($H_4P_2O_7$), triphosphoric acid ($H_5P_3O_{10}$), metaphosphoric acid ($HPO_3$)$_x$, and polyphosphoric acid ($HO[PO_2OH]_nH$).

In another embodiment, a fuel cell is disclosed. The fuel cell may include an anode, a cathode, and a membrane including an electrolyte having a nitrogen-doped phosphate tetrahedral network and having at least one compound of formula (I), (II), or both:

$$H_{3+x}PO_{4-x}N_x \qquad (I),$$

$$H_{3+x-2y}PO_{4-x-y}N_x \qquad (II),$$

where
x is any number between 0.001 and 3 in formula (I) and 0 and 3 in formula (II); and
y is any number between 0 and 1.5.

The at least one compound may further include monoammonium phosphate ($NH_4$)($H_2PO_4$), diammonium phosphate ($NH_4$)$_2HPO_4$, or ammonium polyphosphate $[NH_4PO_3]_n(OH)_2$, where n is the chain length and is 0 to 1000 or more. About 30 to 70% atomic P in the at least one compound of formula (I) may be substituted with Si, B, and/or Al. The operating temperature of the fuel cell may be about 100 to 200° C. The network may be amorphous, comprising nitrogen bridges. The network may include a greater volume amount of compounds of formula (I) than formula (II).

BRIEF DESCRIPTION OF THE DRAWINGS

FIGS. 2A through 2H depict non-limiting examples of atomic structures of compounds of formulas (I) and/or (II);

FIGS. 3A through 3D show atomic structures of phosphoric acid, $H_3PO_4$, having various $OH^-$ groups substituted with $NH^-_2$ and associated deprotonation energies as set forth in Example 15;

FIGS. 4A through 4E depict atomic structures of pyrophosphoric acid, $H_4P_2O_7$, having various $OH^-$ groups substituted with $NH_2^-$ and associated deprotonation energies as set forth in Example 16;

FIGS. 5A through 5C show atomic structures of phosphoric acid, $H_3PO_4$, having various $OH^-$ groups substituted with $H^+$ and associated deprotonation energies as set forth in Example 17;

FIGS. 6A 6C show atomic structures of phosphoric acid, $H_3PO_4$, with added phosphate groups as set forth in Example 18;

FIGS. 7A 7C show atomic structures of phosphoric acid, $H_3PO_4$, with added phosphate groups as set forth in Example 19; and FIG. 8 shows a non-limiting example of a nitrogen-doped phosphate network according to one or more embodiments.

In FIGS. 2A through 8, white color designates hydrogen (H), light grey designates phosphorus (P), dark grey designates oxygen (O), and black designates nitrogen (N).

DETAILED DESCRIPTION

Figure 1:
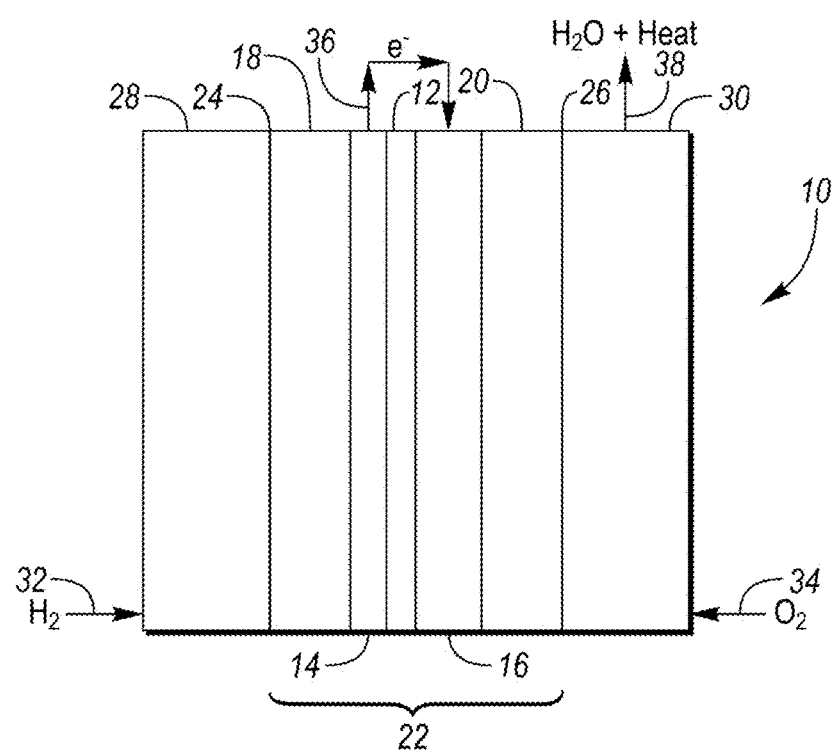
FIG. 1 is a schematic, side view of a fuel cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Due to rising carbon dioxide emissions and the relatively high current dependency on non-renewable fossil fuels as energy carriers in the transportation sector, there is an ever-increasing need to develop and commercialize transportation technologies that use clean and sustainable sources of energy. One technology that possesses promise is a fuel cell. Fuel cell uses oxygen from air and compressed hydrogen as fuel sources, while only emitting water and heat. Fuel cells are a promising opportunity for sustainable energy conversion, for both mobile and stationary usages. The widespread adoption of fuel cells would reduce carbon dioxide emissions. Various types of fuel cells have been developed; each presenting a unique set of challenges.

A typical single fuel cell is composed of a polymer electrolyte membrane (PEM), an anode layer, a cathode layer and gas diffusion layers. These components form a membrane electrode assembly (MEA), which is surrounded by two flow-field plates. FIG. 1 depicts a schematic, side view of a non-limiting example of a fuel cell 10. Individual fuel cells 10 can be stacked to create a fuel cell stack. Fuel cell 10 includes PEM 12, anode layer 14, cathode layer 16 and first and second gas diffusion layers (GDLs) 18 and 20. PEM 12 is situated between anode layer 14 and cathode layer 16. Anode layer 14 is situated between first GDL 18 and PEM 12 and cathode layer 16 is situated between second GDL 20 and PEM 12. PEM 12, anode 14, cathode 16 and first and second GDLs 18 and 20 comprise MEA 22. First and second sides 24 and 26 of MEA 22 are bounded by flow fields 28 and 30, respectively. Flow field 28 supplies $H_2$ to MEA 22, as signified by arrow 32. Flow field 30 supplies $O_2$ to MEA 22, as signified by arrow 34. A catalyst material is used in anode layer 14 and cathode layer 16. The fuel cell functions on the principles described by the following reaction $H_2 + \frac{1}{2}O_2 \rightarrow H_2O + 1.23$ eV.

The PEM is a semipermeable membrane generally made from ionomers and designed to conduct protons while acting as an electronic insulator and reactant barrier, e.g. to oxygen and hydrogen gas. The PEM functions as an electrolyte, separates the cathode from the anode, ensures prevention of chemical and electrical short circuit, ensures ionic mass transport in the cell, and determines operating temperatures of the fuel cell.

The standard mobile fuel cell uses a PEM such as sulfonated fluoropolymer (Nafion™) that conducts protons from the anode ($H_2$ feed) to the cathode ($O_2$) feed, creating water. The Nafion™-based membrane and system requires humidification to sustain proton conductivity and is therefore limited to 100° C., the boiling point of water. If pressurized, the operating temperature may be elevated to about 120 to 130° C.

For a number of reasons, there is a drive for intermediate temperature fuel cells. The biggest drive perhaps being the fact that at higher temperatures, carbon monoxide (CO) does not bind to the catalyst as tightly and catalyst efficiency is increased. Additional advantages associated with elevated temperature fuel cell operation include increased conductivity, prevention of CO poisoning of the catalyst, tolerance to fuel impurities, reduced cooling needs, and higher efficiency. The need for elevated-temperature operating fuel cells has led to additional acid membrane materials development.

A standard stationary fuel cell often uses a solid oxide electrolyte (SOFC) that typically conducts oxygen anions from the cathode ($O_2$ feed) to the anode ($H_2$ feed), creating water. The conduction occurs typically at relatively high temperatures of about 500 to 1,000° C., depending on the materials used. These relatively high temperature ranges may render an SOFC unusable for mobile applications.

An intermediate temperature candidate is a phosphoric acid fuel cell (PAFC). PAFCs are tolerant of $CO_2$ in fuel gas streams and in air, PAFC are also more tolerant of CO than polymer electrolyte membrane fuel cells (PEMFCs). PAFC, which use liquid phosphoric acid ($H_3PO_4$) as an electrolyte, typically operate between about 150° C. and 200° C., depending on the specific materials being used. Phosphoric acid is structurally depicted in FIG. 2A. Typically, a PAFC uses $H_3PO_4$ in a silicon carbide (SiC) matrix as the electrolyte. PAFCs may suffer from relatively low power density and relatively high cost.

Hence, other electrolytes have been suggested for better performance, especially at relatively low temperatures, such as polymers based on polybenzimidazole and polyphenylene. These materials are usually dehydrated with little to no $H_2O$ present at the elevated temperatures of 100° C. and 250° C.

What is needed is a solution to develop a fuel cell electrolyte design to transport the protons from the anode to the cathode at maximum rate and minimal reactivity, while preventing unwanted electronic and gas molecule transport. Aspects of the present disclosure are directed to a novel electrolyte membrane including nitrogen-doped phosphate network including at least one compound of formula (I) and/or (II), optionally modified as described below.

In one or more embodiments, a fuel cell electrolyte is disclosed. The electrolyte may include a nitrogen-doped tetrahedral network. The electrolyte and/or network may include at least one compound having a formula (I):

$$H_{3+x}PO_{4-x}N_x \qquad (I),$$

where

H is hydrogen, P is phosphorus, O is oxygen, N is nitrogen, and x is any number between 0.001 and 3 optionally including a fractional part such as decimals and/or hundredths. x may be 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. x may be any number between 0.001 and 3 including tenths, hundredths, or both. x may be 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.0, 2.01, 2.02, 2.03, 2.04, 2.05, 2.06, 2.07, 2.08, 2.09, 2.1, 2.11, 2.12, 2.13, 2.14, 2.15, 2.16, 2.17, 2.18, 2.19, 2.20, 2.21, 2.22, 2.23, 2.24, 2.25, 2.26, 2.27, 2.28, 2.29, 0.30, 2.31, 2.32, 2.33, 2.34, 2.35, 2.36, 2.37, 2.38, 2.39, 2.40, 2.41, 2.42, 2.43, 2.44, 2.45, 2.46, 2.47, 0.48, 2.49, 2.50, 2.51, 2.52, 2.53, 2.54, 2.55, 2.56, 2.57, 2.58, 2.59, 2.60, 2.61, 2.62, 2.63, 2.64, 2.65, 0.66, 2.67, 2.68, 2.69, 2.70, 2.71, 2.72, 2.73, 2.74, 2.75, 2.76, 2.77, 2.78, 2.79, 2.80, 2.81, 2.82, 2.83, 0.84, 2.85, 2.86, 2.87, 2.88, 2.89, 2.90, 2.91, 2.92, 2.93, 2.94, 2.95, 2.96, 2.97, 2.98, 2.99, or 3.00.

x may be a range including any number named above while excluding at least one number or range mentioned above. For example, x may equal 0.1 to 3.0 with the exclusion of 1 and 2. In an alternative example, x may include one or more ranges of 0.001 to 0.9, 0.1 to 1.9, or 2.1 to 2.9. In a yet another non-limiting example, x may include one or more ranges of 0.001 to 0.99, 1.10 to 1.99, or 2.10 to 2.99.

The at least one compound of formula (I) may be an amidophosphate formed by substitution of one or more $OH^-$ groups of phosphoric acid with $NH^-_2$ groups. The one or more $OH^-$ groups may be substituted in whole or in part. The at least one compound of formula (I) may include phosphoramidate ($H_4PO_3N$), diamidophosphate ($H_5PO_2N_2$), phosphoramide ($H_6PON_3$). Chemical structures of phosphoramidate, diamidophosphate, and phosphoramide are depicted in FIGS. 2B to 2D, respectively.

The word "compound," as used in this application, may be interchanged with terms material, electrolyte material, composition, or electrolyte composition.

The electrolyte and/or network may include at least one compound having a formula (II):

$$H_{3+x-2y}PO_{4-x-y}N_x \qquad (II),$$

where

H is hydrogen, P is phosphorus, O is oxygen, N is nitrogen;

x is any number between 0 and 3 optionally including a fractional part such as decimals and/or hundredths; and y is any number between 0 and 1.5 optionally including a fractional part such as decimals and/or hundredths.

x may be 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. x may be any number between 0 and 3 including tenths, hundredths, or both. x may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.0, 2.01, 2.02, 2.03, 2.04, 2.05, 2.06, 2.07, 2.08, 2.09, 2.1, 2.11, 2.12, 2.13, 2.14, 2.15, 2.16, 2.17, 2.18, 2.19, 2.20, 2.21, 2.22, 2.23, 2.24, 2.25, 2.26, 2.27, 2.28, 2.29, 0.30, 2.31, 2.32, 2.33, 2.34, 2.35, 2.36, 2.37, 2.38, 2.39, 2.40, 2.41, 2.42, 2.43, 2.44, 2.45, 2.46, 2.47, 0.48, 2.49, 2.50, 2.51, 2.52, 2.53, 2.54, 2.55, 2.56, 2.57, 2.58, 2.59, 2.60, 2.61, 2.62, 2.63, 2.64, 2.65, 0.66, 2.67, 2.68, 2.69, 2.70, 2.71, 2.72, 2.73, 2.74, 2.75, 2.76, 2.77, 2.78, 2.79, 2.80, 2.81, 2.82, 2.83, 0.84, 2.85, 2.86, 2.87, 2.88, 2.89, 2.90, 2.91, 2.92, 2.93, 2.94, 2.95, 2.96, 2.97, 2.98, 2.99, or 3.00.

x may be a range including any number named above while excluding at least one number mentioned above. For example, x may equal 0.1 to 3.0 with the exclusion of 1 and 2. In an alternative example, x may include one or more ranges of 0.1 to 0.9, 1.1 to 1.9, or 2.1 to 2.9. In a yet another non-limiting example, x may include one or more ranges of 0.01 to 0.99, 1.10 to 1.99, or 2.10 to 2.99.

y may be 0.1, 0.2, 0.3, 0.4, 0.5, 0.6, 0.7, 0.8, 0.9, 1.0, 1.1, 1.2, 1.3, 1.4, or 1.5. y may be any number between 0 and 1.5 including tenths, hundredths, or both. y may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, or 1.50.

y may be a range including any number named above while excluding at least one number mentioned above. For example, y may equal 0.1 to 1.5 with the exclusion of 1 and 2. In an alternative example, y may include one or more ranges of 0.1 to 0.9 or 1.1 to 1.4. In a yet another non-limiting example, y may include one or more ranges of 0.01 to 0.99 or 1.10 to 1.49.

The at least one compound of formula (II) may be a hypoamidphosphate or polyamidphosphate or multiple such moieties, linked together. The linking may occur as R—P—P—R, R—P—O—P—R, or R—P—X—P—R, where P is phosphorus, O is oxygen, R represents the continuation of the chain, either as additional P, O, or H termination, and X is any carbohydrate moiety containing carbon, hydrogen, and/or oxygen including, but not limited to, $CH_3$, $CH_2$—$CH_3$, and the like. The at least one compound of formula (II) may be formed by linking one or more molecules of formula (I) or by nitrogen-doping one or more polyhypophosphoric acids. The at least one compound of formula (II) may be formed by nitrogen-doping hypophosphoric acid ($H_4P_2O_6$), pyrophosphoric acid ($H_4P_2O_7$), triphosphoric acid ($H_5P_3O_{10}$), metaphosphoric acid $(HPO_3)_x$, polyphosphoric acid ($HO[PO_2OH]_nH$), and the like. The atomic structures of the mentioned acids are depicted in the following Figures: hypophosphoric acid (FIG. 2E), pyrophosphoric acid (FIG. 2F), triphosphoric acid (FIG. 2G), and metaphosphoric acid (FIG. 2H).

Hypophosphoric acid has phosphorus in a formal oxidation state of +4. The phosphorus atoms are identical and joined directly with a PP bond. Polyphosphoric acid is a polymerized phosphorus oxoacid including a backbone chain including alternating P and O atoms covalently bonded together. Pyrophosphoric acid or diphosphoric acid is a component of the polyphosphoric acid. Triphosphoric acid is a condensed form of phosphoric acid, a phosphorus oxoacid and an acyclic phosphorus acid anhydride. Metaphosphoric acid includes cyclic structures formed by bonding of phosphoric acid rings. Metaphosphoric acid includes trimetaphosphoric acid or cyclo-triphosphoric acid ($H_3P_3O_9$) and cyclic compounds with a general formula $(HPO_3)_x$ where x is a number of phosphoric units in the molecule.

Additionally or alternatively, the electrolyte and/or network may include at least one compound of formula (I) or (II) also including nitrogen that is not bound to phosphorus, but instead is bound to hydrogen, forming an ammonium ion or ammonia molecule. In formulas (I) and (II), nitrogen may be the anion that takes the place of oxygen in $H_3PO_4$, etc. Nitrogen may form a $NH_4^+$ ion that takes the place of the hydrogen. Formula (I) or (II) may include monoammonium phosphate $(NH_4)(H_2PO_4)$, diammonium phosphate $(NH_4)_2HPO_4$, or ammonium polyphosphate $[NH_4PO_3]n(OH)_2$, where n is the chain length and may be 0 to 100 (short chain), 100 to 1000 (medium chain), or greater than 1000 (long chain). The value of n may be about, at least about, at most about, or greater than 0 to 1000, 10 to 500, or 50 to 100. The value of n may be 0 to 1000 or more.

For example, the at least one compound may be $(H_{3+x}PO_{4-x}N_x)(NH_4)(H_2PO_4)$, where x is as defined above for formula (I); $(H_{3+x}PO_{4-x}N_x)(NH_4)_2HPO_4$, where x is as defined above for formula (I); $(H_{3+x}PO_{4-x}N_x)[NH_4PO_3]_n(OH)_2$, where x is as defined above for formula (I); $(H_{3+x-2y}PO_{4-x-y}N_x)(NH_4)(H_2PO_4)$, where x and y are as defined above for formula (II); $(H_{3+x-2y}PO_{4-x-y}N_x)(NH_4)_2HPO_4$, where x and y are as defined above for formula (II); or $(H_{3+x-2y}PO_{4-x-y}N_x)[NH_4PO_3]_n(OH)_2$, where x and y are as defined above for formula (II).

The at least one compound may be, for example, $(H_4PO_3N)(NH_4)(H_2PO_4)$, $(H_4PO_3N)(NH_4)_2HPO_4$, $(H_4PO_3N)[NH_4PO_3]n(OH)_2$, $(H_5PO_2N_2)(NH_4)(H_2PO_4)$, $(H_5PO_2N_2)(NH_4)_2HPO_4$, $(H_5PO_2N_2)[NH_4PO_3]n(OH)_2$, $(H_6PON_3)(NH_4)(H_2PO_4)$, $(H_6PON_3)(NH_4)_2HPO_4$, or $(H_6PON_3)[NH_4PO_3]n(OH)_2$.

In at least one embodiment, the electrolyte and/or network may include at least one compound of formula (I) or (II), where about 30 to 70, 40 to 60, or 50 to 55% of the phosphorus atoms are replaced by silicon (Si), boron (B), and/or aluminum (Al). The quantified substitution of P atom may amount to about 30, 32, 34, 36, 38, 40, 42, 44, 46, 48, 50, 52, 54, 56, 58, 60, 62, 64, 68, or 70%. The substitution may be with one, two, or three of the elements of Si, B, and Al. The substitution may include majority of Si, B, or Al.

In a non-limiting example, the at least one compound may be $H_4SiPO_3N$, $H_4BPO_3N$, $H_4AlPO_3N$, $H_4SiBPO_3N$, $H_4SiAlPO_3N$, $H_4SiAlBPO_3N$, $H_4AlBPO_3N$, $H_5SiPO_2N_2$, $H_5BPO_2N_2$, $H_5AlPO_2N_2$, $H_5SiBPO_2N_2$, $H_5SiAlPO_2N_2$, $H_5SiAlBPO_2N_2$, $H_5AlBPO_2N_2$, $H_6SiPON_3$, $H_6BPON_3$, $H_6AlPON_3$, $H_6SiBPON_3$, $H_6SiAlPON_3$, $H_6SiAlBPON_3$, $H_6AlBPON_3$. The at least one compound may be a hypoamidphosphate or polyamidphosphate with at least some of the P atoms being substituted with Si, B, and/or Al. The at least one compound may be $(H_4PO_3N)(NH_4)(H_2PO_4)$, $(H_4PO_3N)(NH_4)_2HPO_4$, $(H_4PO_3N)[NH_4PO_3]n(OH)_2$, $(H_5PO_2N_2)(NH_4)(H_2PO_4)$, $(H_5PO_2N_2)(NH_4)_2HPO_4$, $(H_5PO_2N_2)[NH_4PO_3]n(OH)_2$, $(H_6PON_3)(NH_4)(H_2PO_4)$, $(H_6PON_3)(NH_4)_2HPO_4$, or $(H_6PON_3)[NH_4PO_3]n(OH)_2$ with at least some of the P atoms being substituted with Si, B, and/or Al such as, for example, $(H_4SiPO_3N)(NH_4)(H_2PO_4)$, $(H_4PO_3N)(NH_4)(H_2SiPO_4)$, $(H_4SiPO_3N)(NH_4)(H_2SiPO_4)$, $(H_4SiBPO_3N)(NH_4)(H_2PO_4)$, $(H_4PO_3N)(NH_4)(H_2SiBPO_4)$, $(H_4SiBPO_3N)(NH_4)(H_2SiBPO_4)$, $(H_4SiAlPO_3N)(NH_4)(H_2PO_4)$, $(H_4PO_3N)(NH_4)(H_2SiAlPO_4)$, $(H_4SiAlPO_3N)(NH_4)(H_2SiAlPO_4)$, $(H_4SiBAlPO_3N)(NH_4)(H_2PO_4)$, $(H_4PO_3N)(NH_4)(H_2SiBAlPO_4)$, or $(H_4SiBAlPO_3N)(NH_4)(H_2SiBPAlO_4)$.

In another example embodiment, the at least one compound may include at least one compound of formula (I) or (II) combined with $H_3PO_4$. The at least one compound may include at least one compound of formula (I) or (II) and also including monoammonium phosphate $(NH_4)(H_2PO_4)$, diammonium phosphate $(NH_4)_2HPO_4$, or ammonium polyphosphate $[NH_4PO_3]n(OH)_2$. The at least one compound may include a compound of formula (I) or (II), and optionally also including monoammonium phosphate $(NH_4)(H_2PO_4)$, diammonium phosphate $(NH_4)_2HPO_4$, or ammonium polyphosphate $[NH_4PO_3]n(OH)_2$ with at least some of the P atoms substituted with Si, B, and/or Al, combined with $H_3PO_4$. The at least one compound may include about 1 to 99% $H_3PO_4$, based on the total weight or volume of the compound.

The at least one compound may include $(H_{3+x}PO_{4-x}N_x)$ $(H_3PO_4)$, where x is as defined above for formula (I) such as, for example, $(H_4PO_3N)(H_3PO_4)$; $(H_5PO_2N_2)(H_3PO_4)$; $(H_6PON_3)(H_3PO_4)$ or $(H_{3+x}PO_{4-x}N_x)(NH_4)(H_2PO_4)$ $(H_3PO_4)$, where x is as defined above for formula (I); $(H_{3+x}PO_{4-x}N_x)(NH_4)_2HPO_4(H_3PO_4)$, where x is as defined above for formula (I); $(H_{3+x}PO_{4-x}N_x)[NH_4PO_3]n(OH)_2$ $(H_3PO_4)$, where x, n are as defined above.

The at least one compound may include $(H_{3+x-2y}PO_{4-x-y}N_x)(NH_4)(H_2PO_4)(H_3PO_4)$, where x and y are as defined above for formula (II); $(H_{3+x-2y}PO_{4-x-y}N_x)$ $(NH_4)_2HPO_4(H_3PO_4)$, where x and y are as defined above for formula (II); or $(H_{3+x-2y}PO_{4-x-y}N_x)[NH_4PO_3]n(OH)_2$ $(H_3PO_4)$, where x and y are as defined above for formula (II).

Non-limiting examples of the at least one compound having at least one P atom substituted with Si, B, and/or Al and including $(H_3PO_4)$ may be $H_4SiPO_3N(H_3PO_4)$, $H_4BPO_3N(H_3PO_4)$, $H_4AlPO_3N(H_3PO_4)$, $H_4SiBPO_3N$ $(H_3PO_4)$, $H_4SiAlPO_3N(H_3PO_4)$, $H_4SiAlBPO_3N(H_3PO_4)$, $H_4AlBPO_3N(H_3PO_4)$, $H_5SiPO_2N_2(H_3PO_4)$, $H_5BPO_2N_2$ $(H_3PO_4)$, $H_5AlPO_2N_2(H_3PO_4)$, $H_5SiBPO_2N_2(H_3PO_4)$, $H_5SiAlPO_2N_2(H_3PO_4)$, $H_5SiAlBPO_2N_2(H_3PO_4)$, $H_5AlBPO_2N_2(H_3PO_4)$, $H_6SiPON_3(H_3PO_4)$, $H_6BPON_3$ $(H_3PO_4)$, $H_6AlPON_3(H_3PO_4)$, $H_6SiBPON_3(H_3PO_4)$, $H_6SiAlPON_3(H_3PO_4)$, $H_6SiAlBPON_3(H_3PO_4)$, $H_6AlBPON_3(H_3PO_4)$. The at least one compound may be a hypoamidphosphate or polyamidphosphate with at least some of the P atoms being substituted with Si, B, and/or Al. The at least one compound may be $(H_4PO_3N)(NH_4)(H_2PO_4)$ $(H_3PO_4)$, $(H_4PO_3N)(NH_4)_2HPO_4(H_3PO_4)$, $(H_4PO_3N)$ $[NH_4PO_3]n(OH)_2(H_3PO_4)$, $(H_5PO_2N_2)(NH_4)(H_2PO_4)$ $(H_3PO_4)$, $(H_5PO_2N_2)(NH_4)_2HPO_4(H_3PO_4)$, $(H_5PO_2N_2)$ $[NH_4PO_3]n(OH)_2(H_3PO_4)$, $(H_6PON_3)(NH_4)(H_2PO_4)$ $(H_3PO_4)$, $(H_6PON_3)(NH_4)_2HPO_4(H_3PO_4)$, or $(H_6PON_3)$ $[NH_4PO_3]n(OH)_2(H_3PO_4)$ with at least some of the P atoms being substituted with Si, B, and/or Al such as, for example, $(H_4SiPO_3N)(NH_4)(H_2PO_4)(H_3PO_4)$, $(H_4PO_3N)(NH_4)$ $(H_2SiPO_4)(H_3PO_4)$, $(H_4SiPO_3N)(NH_4)(H_2SiPO_4)$ $(H_3PO_4)$, $(H_4SiBPO_3N)(NH_4)(H_2PO_4)(H_3PO_4)$, $(H_4PO_3N)(NH_4)$ $(H_2SiBPO_4)$, $(H_4SiBPO_3N)(NH_4)(H_2SiBPO_4)(H_3PO_4)$, $(H_4SiAlPO_3N)(NH_4)(H_2PO_4)(H_3PO_4)$, $(H_4PO_3N)(NH_4)$ $(H_2SiAlPO_4)(H_3PO_4)$, $(H_4SiAlPO_3N)(NH_4)(H_2SiAlPO_4)$ $(H_3PO_4)$, $(H_4SiBAlPO_3N)(NH_4)(H_2PO_4)(H_3PO_4)$, $(H_4PO_3N)(NH_4)(H_2SiBAlPO_4)(H_3PO_4)$, or $(H_4SiBAlPO_3N)(NH_4)(H_2SiBPAlO_4)$ $(H_3PO_4)$.

In a similar manner, the at least one compound of formula (I) or (II) with P substituted or unsubstituted, and/or containing monoammonium phosphate $(NH_4)(H_2PO_4)$, or diammonium phosphate $(NH_4)_2HPO_4$, or ammonium polyphosphate $[NH_4PO_3]n(OH)_2$ may be combined with one or more polyhypophosphoric acids such as hypophosphoric acid $(H_4P_2O_6)$, polyphosphoric acid $(HO[PO_2OH]_nH)$, pyrophosphoric acid $(H_4P_2O_7)$, triphosphoric acid $(H_5P_3O_{10})$, metaphosphoric acid $(HPO_3)_x$, and the like.

The electrolyte and/or network may contain at least one, one or more compounds, or a plurality of compounds named above or a combination of any number of the compounds named above. The number may be 1, 2, 3, 4, 5, 6, 7, 8, 9, 10, 20, 25, 50, 75, 100, or more. The electrolyte and/or network may include about an equal weight or volume amount of compounds of formula (I) and formula (II). The electrolyte and/or network may include a greater or lesser amount of compounds of formula (I) than formula (II) or vice versa.

The at least one compound named above may be used in the anhydrous form in the electrolyte. The electrolyte may be used in conjunction with any membrane suitable for PAFC, including a SiC matrix, benzimadole-PA, or quaternary ammonium phiphosphate polyphenylene (QAPOH).

It is contemplated that upon exposure to water, the $PNH_2$ moiety would hydrate into $POH^-$ and $NH_3^+$, depending on the relevant temperature and/or pH conditions. For example, at the low-pH conditions (pH less than 7) at a fuel cell, the $PNH_2$ moiety may form $NH_4^+$. Such formation is advantageous for proton transport through the Grotthus mechanism or proton jumping. Grotthus mechanism is a process by which an "excess" proton or proton defect diffuses through a hydrogen bond network of water molecules or other hydrogen-bonded liquids through the formation and concomitant cleavage of covalent bonds involving neighboring molecules. Presence of the Grotthus mechanism thus enhances proton transport. The desirable amount of $NH_4$ may be less than about 0.2 mole percent as a higher amount may cause degradation of oxygen reduction reaction (ORR) in the cell.

The electrolyte may form a nitrogen-doped phosphate network with different configurations. The network may be amorphous or crystalline. The electrolyte is atomically comprised of a tetrahedral network, where each tetrahedron has a cation center (P) and 4 anions (typically O or N), which form the network. Each tetrahedron may be linked to 0, 1, 2, 3, or 4 other tetrahedra. The linked tetrahedra lead to a formation of a corner-sharing network. The shared corner may include oxygen or nitrogen. Nitrogen, being more negative than oxygen, increases corner sharing within the network. A tetrahedron is defined as a triangular pyramid, a polyhedron composed of four triangular faces, six straight edges, and four vertex corners. A non-limiting example of the herein-disclosed network with tetrahedra is depicted in FIG. 8, which shows one-dimensional phosphate chains including nitrogen linkers with water molecules within the network.

The presence of nitrogen in the herein-disclosed electrolyte may contribute to one or more desirable effects. The first effect is a formation of corner-sharing network that enhances cationic transport, e.g. a bridging nitrogen. Introduction of nitrogen into the P-based electrolyte compounds may promote cross-linking via formation of nitrogen bridges. Nitrogen bridges form between two phosphorus tetrahedra sharing one corner nitrogen. The increased cross-linking density of the electrolyte network with the nitrogen content may cause "mixed anion effect" and promote $H^+$ mobility within the network. It is also contemplated that the higher covalency of P—N bonds, with respect to P—O, may result in a reduction of the overall electrostatic interaction with $H^+$, resulting in a lower activation energy and higher ionic conductivity. The bridging may include double bridging configuration including two phosphorus tetrahedra sharing one N, or triple bridging with three phosphorus tetrahedra sharing one N.

The second effect is formation of anionic centers ("apical nitrogen") that may also enhance cationic transport. Apical nitrogen relates to a corner nitrogen on a phosphorus tetrahedron which is not shared with another tetrahedron. Apical nitrogen may contribute to formation of isolated $PO_3N$ units.

Additionally, nitrogen enhances amorphization of the phosphate network, which increases cation transport. Amorphization relates to a process of forming an amorphous structure or loss of crystalline structure. The amorphization contributes to formation of linked phosphate structures with improved conductivity when compared to conductivity in a phosphoric acid system without nitrogen.

The electrolyte and/or network's high ionic conductivity and low proton binding is illustrated in the Examples below. The pKa of the electrolyte, network, the at least one compound of formula (I), the at least one compound of formula (II), or a combination thereof may be about 0.5 to 7. The pKa of the electrolyte, network, the at least one compound of formula (I), the at least one compound of formula (II), or a combination thereof may be about, at least about, or at most about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, or 7.0. The pKa of the electrolyte, network, the at least one compound of formula (I), the at least one compound of formula (II), or a combination thereof may encompass a range including any two numbers named above.

To maximize the electrolyte's ionic conductivity, the fuel cell operating temperature may be in the range of about 100 to 250, 125 to 200, or 150 to 175° C. The temperature should reflect the electrolyte's maximum ability to conduct ions. The temperature may be about, at least about, or at most about 100, 105, 110, 115, 120, 125, 130, 135, 140, 145, 150, 155, 160, 165, 170, 175, 180, 185, 190, 195, or 200° C. The operating temperature may encompass a range including any two numbers named above.

The nitrogen-doped phosphate network may be further modified by adjusting H:P and/or O:N ratios during synthesis to achieve beneficial ion conductivity rate while maintaining low electrolyte electronic conductivity. The ratios of H:P and O:N may be at or near stoichiometry. The ideal values depend on synthesis conditions and charge balance. The material composition may be analytically identified by its NMR or Raman spectra such as 1H or 31P NMR.

The electrolyte, network, the at least one compound of formula (I), and/or the at least one compound of formula (II) may be prepared by any traditional synthesis method. For example, linking may be achieved via elevated temperature or heating and/or relatively low pressure to remove oxygen and cause linking. Nonlimiting example of precursors may include phenylphosphorodiamidate and related phenyl-based molecules, removing the phenyl group by reaction with sodium hydroxide.

EXAMPLES

Examples 1 to 14

Ionic conductivity correlates with proton binding energy, where looser proton binding provides for a better conductivity, all else being equal. The proton binding energy in Examples 1 to 14 was identified in two different ways:

(1) Direct calculation marked as "deprotonation energy" in Table 1 below.

The calculations were performed with ORCA quantum chemistry code. The geometry was computed at the theory level B3LYP/aug-cc-pvdz. The single-point energy was computed at the theory level RI-MP2/aug-cc-pvdz, with basis set corrections (B3LYP/cc-pvqz-B3LYP/cc-pvdz) and correlation corrections (DLPNO-CCSD(T)/aug-cc-pvdz-RI-MP2/aug-cc-pvdz). All calculations, except for the correlation corrections, were performed with implicit water solvation in the CPCM model. These have an arbitrary offset due to the solvation energy. The deprotonation energy is defined as the energy of the deprotonated state, relative to the protonated state, subject to the aforementioned arbitrary offset.

Proton conductivity is correlated to the proton binding energy in the following manner. Looser or weaker proton binding results in enhanced ionic/proton conductivity. The lower the deprotonation energy, the more favored the deprotonated state is, the weaker the proton binding, and the better ionic conductivity. This is because the energy barrier for protons to hop between molecules is lower, leading to enhanced transport.

TABLE 1

Calculated deprotonation energy for Examples 1 to 14

| Ex. No. | Example Name | Formula | H:P ratio | O:P ratio | N:P ratio | Deprotonation energy (eV, arb. zero) | Notes |
|---|---|---|---|---|---|---|---|
| 1 | Phosphoric acid | $H_3PO_4$ | 3 | 4 | 0 | −1.3006 | — |
| 2 | Hypophosphoric acid | $H_4P_2O_6$ | 2 | 3 | 0 | −1.5472 | — |
| 3 | Pyrophosphoric acid (diphosphoric acid) | $H_4P_2O_7$ | 2 | 3.5 | 0 | −1.6028 | — |
| 4 | [Hydroxy(phosphono)phosphoryl]phosphonic acid | $H_5P_3O_8$ | 1.67 | 2.67 | 0 | −1.6059 | — |
| 5 | Triphosphoric acid | $H_5P_3O_{10}$ | 1.67 | 3.33 | 0 | −1.7282 | — |
| 6 | Imidodiphosphoric acid | $H_5P_2O_6N$ | 2.5 | 3 | 0.5 | −1.4242 | NH bridging |
| 7 | [(Trihydroxy-lambda5-phosphanylidene)amino]phosphonic acid | $H_5P_2O_6N$ | 2.5 | 3 | 0.5 | −1.4822 | N bridging |
| 8 | Dihydroxyphosphinimyl dihydrogen phosphate | $H_5P_2O_6N$ | 2.5 | 3 | 0.5 | −1.6362 | NH apical |
| 9 | Amidodiphosphoric acid | $H_5P_2O_6N$ | 2.5 | 3 | 0.5 | −1.4631 | $NH_2$ apical |
| 10 | Phosphoramidate | $H_4PO_3N$ | 4 | 3 | 1 | −1.2003 | — |
| 11 | Diamidophosphate | $H_5PO_2N_2$ | 5 | 2 | 2 | −1.0643 | — |
| 12 | Phosphoramide | $H_6PON_3$ | 6 | 1 | 3 | 0.0348 | — |
| 13 | Hypophosphorous acid (phosphinic acid) | $H_3PO_2$ | 3 | 2 | 0 | −0.1915 | — |
| 14 | Phosphonic acid | $H_3PO_3$ | 3 | 3 | 0 | −1.2706 | — |

* depending on substitutes (2) Comparison of pKa values marked as "pKa" in Table 2 below.

The acid dissociation constant, pKa, of various compounds was compared to illustrate enhanced proton conductivity of the herein-disclosed nitrogen-doped phosphate network. pKa is a quantitative measure of the strength of an acid. The dissociation constant is defined by $pKa=-\log K_a=\log[BH]- \log[H^+]- \log[B^-]$, where B is the counterion (e.g. $H_2PO_4$ for the first deprotonation of phosphoric acid). A higher pKa is associated with less deprotonation or removal/transport of hydrogen. A lower pKa provides for easier deprotonation and enhanced proton transport within the disclosed phosphate network and is thus associated with looser proton binding and enhanced conductivity. The lower pKa also indicates increased corner-sharing of the doped nitrogen in the disclosed phosphate network.

bridging and apical nitrogen result in increased deprotonation energies, although the carrier concentration of hydrogens increases as well.

In Example 17, phosphoric acid, $H_3PO_4$, $OH^-$ groups were substituted with $H^+$, which has resulted in increased deprotonation energy values, and enhanced ionic conductivity, as is shown in FIGS. 5A to 5C.

In Examples 18 and 19, depicted in FIGS. 6A-6C and FIGS. 7A to 7C, respectively, phosphate groups were added to phosphoric acid, $H_3PO_4$, with and without oxygen linkers. No nitrogen substitution was introduced. The increasing chain length, with no nitrogen substitution, resulted in increased deprotonation and therefore enhanced conductivity.

While exemplary embodiments are described above, it is not intended that these embodiments describe all possible

TABLE 2 pKa and NMR peak values for Examples 1 to 14

| Ex. No. | Compound Name | Formula | pKa values (pKa source in footnotes) | 31P NMR spectrum (ppm) | NMR solvent (NMR source in footnotes) |
|---|---|---|---|---|---|
| 1 | Phosphoric acid | $H_3PO_4$ | 2.2, 7.2, 12.3 [1] | 0.7 [7] | KCl—HCl_0.5_M_PH_1.1 [7] |
| 2 | Hypophosphoric acid | $H_4P_2O_6$ | 2.2, 2.8, 7.3, 10.0 [2] | — | — |
| 3 | Pyrophosphoric acid (diphosphoric acid) | $H_4P_2O_7$ | 0.9, 2.1, 6.7, 9.32 [1] | −12.6 [7] | DMSO-D6 [7] |
| 4 | [Hydroxy(phosphono)phosphoryl]phosphonic acid | $H_5P_3O_8$ | — | — | — |
| 5 | Triphosphoric acid | $H_5P_3O_{10}$ | 0.89 [3] | −12.8 [7] | DMSO-D6 [7] |
| 6 | Imidodiphosphoric acid | $H_5P_2O_6N$ | — | — | — |
| 7 | [(Trihydroxy-lambda5-phosphanylidene)amino]phosphonic acid | $H_5P_2O_6N$ | — | — | — |
| 8 | Dihydroxyphosphinimyl dihydrogen phosphate | $H_5P_2O_6N$ | — | — | — |
| 9 | Amidodiphosphoric acid | $H_5P_2O_6N$ | — | — | — |
| 10 | Phosphoramidate | $H_4PO_3N$ | ~3.4, ~8.3 [4] | −2.7 [7] | PH = 5.8 [7] |
| 11 | Diamidophosphate | $H_5PO_2N_2$ | — | — | — |
| 12 | Phosphoramide | $H_6PON_3$ | — | — | — |
| 13 | Hypophosphorous acid (phosphinic acid) | $H_3PO_2$ | 1.1 [5] | 7.3 [8] | DMSO-D6 [8] |
| 14 | Phosphonic acid | $H_3PO_3$ | 1.1-2.3, 5.3-7.2 [6] | 2.7 [7] | DMSO-D6 [7] |

[1] CRC Handbook, 100th edition
[2] Wikipedia, citing Greenwood, Norman N.; Earnshaw, Alan (1984). Chemistry of the Elements.
[3] Drugbank.ca
[4] Chanley and Feageson, JACS 85:1181 (1963)
[5] Kirk et al. Biophys J. 54:241 (1988)
[6] Sevrain et al., Beilstein J Org Chem 13:2186 (2017)
[7] Pubchem
[8] Spectrabase Examples 15 to 20

In Example 15, phosphoric acid, $H_3PO_4$, $OH^-$ groups were substituted with $NH^-_2$. The results are captured in FIGS. 3A to 3D. FIGS. 3A to 3D also show deprotonation energy, which increased with the increasing amount of substituted $OH^-$ groups. The rising deprotonation energy leads to tighter proton binding and therefore decreased conductivity. This is in contrast to the increased proton concentration that adds conductivity, leading to an optimization expected for an intermediate ratio of nitrogen to oxygen.

In Example 16, pyrophosphoric acid, $H_4P_2O_7$, $OH^-$ groups were substituted with $NH^-_2$. The chemical structures and deprotonation energies are depicted in FIGS. 4A to 4E. Generally, the deprotonation energy increases with the substitution. As can be seen from FIGS. 4B to 4D, both the forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell electrolyte comprising:
a nitrogen-doped phosphate tetrahedral network having a plurality of nitrogen bridges and a plurality of linked tetrahedra, each of the plurality of the linked tetrahedra having a phosphorus cation center and four anions including oxygen or nitrogen, the network having at least one compound of formula (I):

$$H_{3+x}PO_{4-x}N_x \qquad (I),$$

where x is any number between 0.001 and 2.9 with the exception of diammonium phosphate $(NH_4)_2HPO_4$.

2. The electrolyte of claim 1, wherein the at least one compound of formula (I) comprises phosphoramidate $(H_4PO_3N)$, diamidophosphate $(H_5PO_2N_2)$, or both.

3. The electrolyte of claim 1, wherein the at least one compound of formula (I) has a pKa value of 0.5 to 7.

4. The electrolyte of claim 1, wherein the at least one compound of formula (I) comprises ammonium polyphosphate $[NH4PO3]n(OH)2$, where n is the chain length and is $0<n\leq 1000$.

5. The electrolyte of claim 1, wherein about 30 to 70% atomic P in the at least one compound of formula (I) is substituted with Si, B, and/or Al.

6. The electrolyte of claim 1, wherein the network further comprises at least one compound of formula (II):

$$H_{3+x-2y}PO_{4-x-y}N_x \qquad (II),$$

where
x is any number between 0.1 and 3, and
y is any number between 0.1 and 1.5.

7. The electrolyte of claim 1, wherein the network further includes at least one of phosphoric acid $(H_3PO_4)$, nitrogen-doping hypophosphoric acid $(H_4P_2O_6)$, pyrophosphoric acid $(H_4P_2O_7)$, triphosphoric acid $(H_5P_3O_{10})$, metaphosphoric acid $(HPO_3)_x$, and polyphosphoric acid $(HO[PO_2OH]_nH)$.

8. A fuel cell comprising:
an anode;
a cathode; and
a membrane including an electrolyte having a nitrogen-doped phosphate tetrahedral network having a plurality of nitrogen bridges and having at least one compound of formula (I) and at least one compound of formula (II):

$$H_{3+x}PO_{4-x}N_x \qquad (I),$$

$$H_{3+x-2y}PO_{4-x-y}N_x \qquad (II),$$

where
x is any number between 0.1-0.9, 1.1-1.9, or 2.1-2.9 in formula (I) and 0.1-0.9 and 1.1-3 in formula (II); and
y is any number between 0 and 1.5.

9. The fuel cell of claim 8, wherein the network further comprises monoammonium phosphate $(NH_4)(H_2PO_4)$, diammonium phosphate $(NH_4)_2HPO_4$, or ammonium polyphosphate $[NH_4PO_3]_n(OH)_2$, where n is the chain length and is $0<n\leq 1000$.

10. The fuel cell of claim 8, wherein about 30 to 70% atomic P in the at least one compound of formula (I) is substituted with Si, B, and/or Al.

11. The fuel cell of claim 8, wherein the operating temperature of the fuel cell is about 100 to 200° C.

12. The fuel cell of claim 8, wherein the network is amorphous.

13. The fuel cell of claim 8, wherein the network includes a greater volume amount of compounds of formula (I) than formula (II).

* * * * *